(12) United States Patent
Gotwals et al.

(10) Patent No.: US 10,029,642 B2
(45) Date of Patent: Jul. 24, 2018

(54) ENHANCED STEERING SYSTEM UTILIZING FIXED DAB FOR OCCUPANT PROTECTION IN FRONTAL IMPACTS WITH LATERIAL LOADING

(71) Applicants: Hyundai America Technical Center, Inc, Superior Township, MI (US); Hyundai Motor Company, Seoul (KR); Kia Motors Corporation, Seoul (KR)

(72) Inventors: David Gotwals, Howell, MI (US); Kurt Shanks, Ann Arbor, MI (US); Barry Phillips, Brooklyn, MI (US)

(73) Assignees: Hyundai America Technical Center, Inc, Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/074,544

(22) Filed: Mar. 18, 2016

(65) Prior Publication Data
US 2017/0267201 A1    Sep. 21, 2017

(51) Int. Cl.
*B60R 21/203* (2006.01)
*B62D 1/19* (2006.01)
(Continued)

(52) U.S. Cl.
CPC ........ *B60R 21/2032* (2013.01); *B60R 21/231* (2013.01); *B60R 21/268* (2013.01);
(Continued)

(58) Field of Classification Search
CPC ... B60R 21/2032; B60R 21/203; B62D 1/105; B62D 1/192; B62D 1/19
(Continued)

(56) References Cited

U.S. PATENT DOCUMENTS

| 3,801,123 A | * | 4/1974 | Jira | ..................... B60R 21/2032 |
| | | | | 280/731 |
| 3,910,597 A | * | 10/1975 | Seko | ................... B60R 21/2032 |
| | | | | 224/276 |

(Continued)

FOREIGN PATENT DOCUMENTS

| JP | 05-330435 A | 12/1993 |
| JP | 2009-143542 A | 7/2009 |

(Continued)

OTHER PUBLICATIONS

Wikipedia webpage for "Gear", https://en.wikipedia.org/wiki/Gear, May 11, 2017.*

*Primary Examiner* — Keith J Frisby
(74) *Attorney, Agent, or Firm* — Mintz Levin Cohn Ferris Glovsky and Popeo, P.C.; Peter F. Corless

(57) ABSTRACT

A steering column system includes: a rotatable steering shaft that has a proximal end attached to a steering wheel and is configured to transfer rotational input at the steering wheel to a steering rack of the vehicle; a stationary driver-side airbag (DAB) shaft that is mounted in the vehicle and extends along the steering shaft; and a DAB module that contains an airbag and is fixedly mounted to a proximal end of the DAB shaft within a region of the steering wheel. The steering wheel and the steering shaft are configured to rotate independently of the DAB module and the DAB shaft, respectively.

12 Claims, 5 Drawing Sheets

(51) Int. Cl.
  *B62D 1/10* (2006.01)
  *B60R 21/231* (2011.01)
  *B60R 21/268* (2011.01)
  *B62D 3/12* (2006.01)

(52) U.S. Cl.
  CPC ............ *B62D 1/105* (2013.01); *B62D 1/192* (2013.01); *B62D 3/126* (2013.01)

(58) Field of Classification Search
  USPC .................................................. 280/731, 777
  See application file for complete search history.

(56) References Cited

U.S. PATENT DOCUMENTS

| | | | |
|---|---|---|---|
| 4,607,539 A | | 8/1986 | Arima et al. |
| 4,932,285 A | | 6/1990 | Tsukamoto |
| 5,152,358 A | * | 10/1992 | Kozuka ................. B60K 35/00 180/78 |
| 5,947,514 A | * | 9/1999 | Keller ................... B60R 21/205 280/735 |
| 6,149,188 A | | 11/2000 | Simpson et al. |
| 6,893,044 B2 | | 5/2005 | Holmes et al. |
| 7,350,806 B2 | | 4/2008 | Ridolfi et al. |
| 7,380,828 B2 | | 6/2008 | Menjak et al. |
| 2008/0277178 A1 | | 11/2008 | Poli et al. |
| 2009/0152840 A1 | * | 6/2009 | Choi ................... B60R 21/2032 280/728.2 |

FOREIGN PATENT DOCUMENTS

| | | |
|---|---|---|
| KR | 10-1998-0061249 A | 10/1998 |
| KR | 10-1998-0056488 A | 12/1999 |
| WO | 2006/103553 A1 | 10/2006 |

\* cited by examiner

OBLIQUE-IMPACT COLLISION

FRONTAL-IMPACT COLLISION

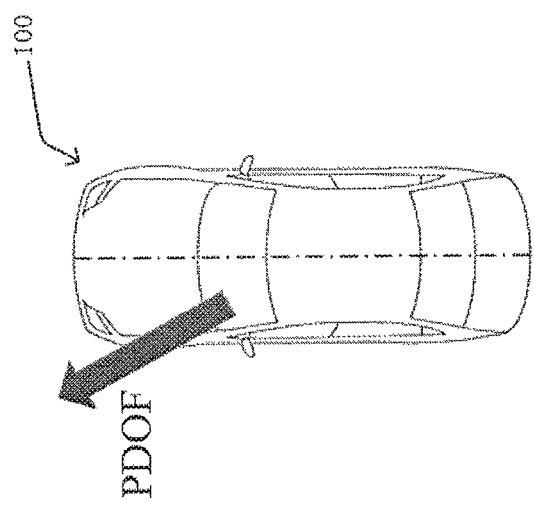

ENHANCED STEERING SYSTEM UTILIZING FIXED DAB FOR OCCUPANT PROTECTION IN FRONTAL IMPACTS WITH LATERAL LOADING

BACKGROUND (a) Technical Field

The present disclosure relates generally to vehicular safety, and more particularly, to a steering column system for enhanced vehicle occupant safety.

(b) Background Art

Crash tests are a form of destructive testing usually performed in order to ensure safe design standards for various modes of transportation including, primarily, vehicles. There are different types of crash testing—administered in the United States by the National Highway Transportation Safety Administration (NHTSA)—for evaluating different aspects of a vehicle's crashworthiness. The most traditional crash test is known as a "frontal-impact crash test," whereby a vehicle is driven to collide head-on with a barrier, such as a concrete wall. FIG. 1A illustrates an example frontal-impact crash test, in which the angle of impact directly opposes the direction in which the vehicle 100 travels. In this case, a load generated by colliding with the barrier 110 is experienced throughout the entire front end of the vehicle 100. Meanwhile, in "overlap crash tests," only part of the front end of a vehicle impacts a barrier. The impact force remains approximately the same as in a frontal-impact test, but a smaller fraction of the vehicle is required to absorb the force.

Recently, the NHTSA proposed a new "oblique frontal crash test," where a vehicle is struck by a barrier (e.g., a Research Movable Deformable Barrier (RMDB)) at an angle that is offset from the direction in which the vehicle travels. For instance, FIG. 1B illustrates an example oblique frontal crash test, in which a barrier 110—a moving barrier in this case—collides with the vehicle 100 at an offset of 15° with respect to the direction in which the vehicle 100 travels (with an overlap of 35%). An "oblique" collision, as shown in FIG. 1B, can occur whenever a vehicle impacts another object at an angle offset from the vehicle's direction of travel (i.e., a non-frontal-impact-type collision), such as an errant vehicle veering into oncoming traffic and striking another car.

Notably, in oblique frontal collisions, where the primary loading is not experienced throughout the entire front end of the vehicle, the lateral acceleration of the collision will cause an occupant (e.g., driver, passenger, etc.) to move toward the Principal Direction of Force (PDOF), causing both forward and lateral motion of the driver, as shown in FIG. 2. If the PDOF is far enough off-center, an occupant may load the traditional frontal restraints (e.g., airbag system) in a manner not represented in current regulatory testing. Indeed, recent oblique collision testing has shown that a primary frontal airbag system alone has failed to adequately protect a driver where kinematics of the driver have significant lateral input, propelling the driver between the conventional driver-side airbag and a curtain airbag (if one exists), and causing the driver to strike the dash panel in an unsafe manner. Thus, traditional frontal restraints may not provide a sufficient level of protection for the occupant in the event of an oblique frontal collision, as they would if loaded in a more traditional regulatory loading condition, such as a head-on collision.

SUMMARY OF THE DISCLOSURE

The present disclosure provides a steering column system in which a central driver-side airbag (DAB) shaft extends along a rotatable steering shaft of the vehicle. The DAB shaft is mounted in the vehicle such that the shaft is stationary. A DAB module containing an airbag is connected to a proximal end of the DAB shaft within an area of a steering wheel that is connected to a proximal end of the rotatable steering shaft. The steering wheel and DAB module are de-coupled to one another and do not interact with each other. As a result, the DAB module remains fixed even as the steering wheel rotates about the module.

According to embodiments of the present disclosure, a steering column system includes: a rotatable steering shaft that has a proximal end attached to a steering wheel and is configured to transfer rotational input at the steering wheel to a steering rack of the vehicle; a stationary driver-side airbag (DAB) shaft that is mounted in the vehicle and extends along the steering shaft; and a DAB module that contains an airbag and is fixedly mounted to a proximal end of the DAB shaft within a region of the steering wheel. The steering wheel and the steering shaft are configured to rotate independently of the DAB module and the DAB shaft, respectively.

The DAB module may remain in a fixed position while the steering wheel rotates about the DAB module. The DAB module may be positioned to oppose a driver of the vehicle during the use of the vehicle. The steering wheel and the DAB module may not be attached to one another.

The steering shaft may be hollow and substantially surround the DAB shaft. The steering column system may further include a spacing component that is disposed along an interior of the steering shaft to prevent contact between the DAB shaft and the steering shaft.

The steering column system may further include a gear assembly mounted at a distal end of the steering shaft and including a set of helical gears which transfers the rotational input at the steering wheel to the steering rack. A first gear of the set of helical gears may be integrally formed with the steering shaft, and a second gear of the set of helical gears may be coupled to the first gear and not integrally formed with the steering shaft.

The steering column system may further include an outer shaft assembly that encloses the steering shaft and the DAB shaft. The steering column system may further include a spacing component that is disposed along an interior of the outer shaft assembly to prevent contact between the outer shaft assembly and the steering shaft or the DAB shaft. The outer shaft assembly may be attached to an instrument panel of the vehicle.

The steering column system may further include one or more internal energy absorbing components that are disposed within an interior of the steering shaft for absorbing energy during a collision event. The steering column system may further include one or more external energy absorbing components that are mounted outside of the steering shaft to an instrument panel of the vehicle for absorbing energy during a collision event.

The distal end of the DAB shaft may be mounted to a body of the vehicle or an instrument panel of the vehicle.

The DAB shaft may be substantially hollow and allow for passage of compressed air therethrough to inflate the airbag contained in the DAB module. The steering column system may further include a compressed gas assembly that is configured to supply compressed gas to the substantially hollow DAB shaft.

The proximal end of the steering shaft may be directly attached to the steering wheel.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 2 illustrates an example of vehicle occupant kinematics in response to an oblique collision;

Figure 1B:
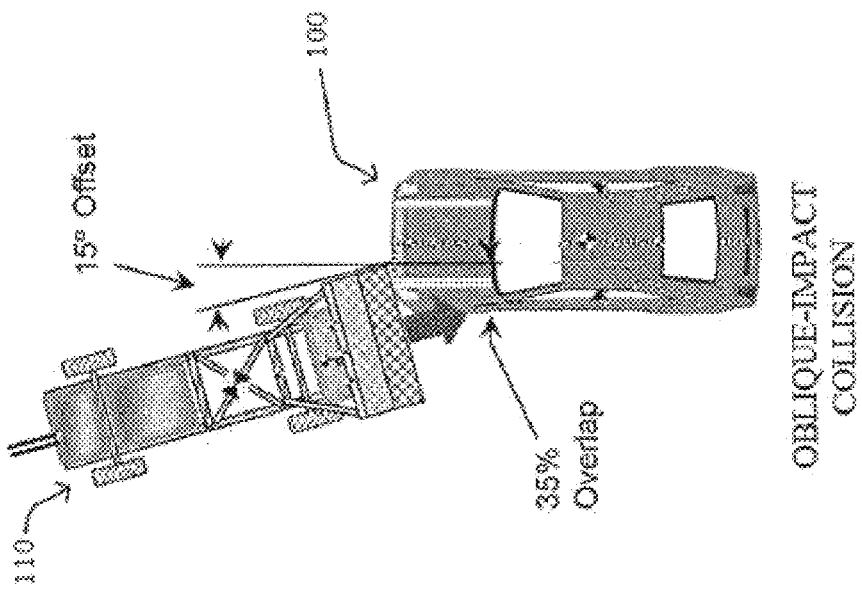
FIGS. 1A and 1B illustrate example collision testing.
Figure 1A:
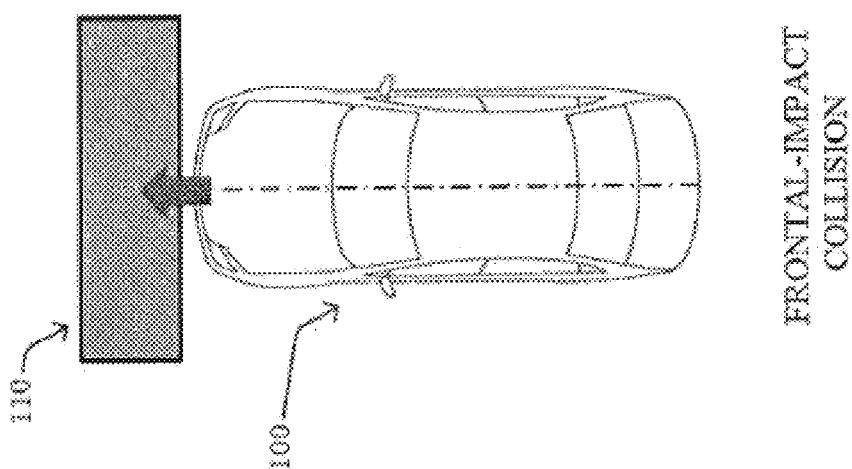

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Referring now to embodiments of the present disclosure, a vehicle may include a steering column system in which a steering wheel is connected to a rotatable steering shaft of the vehicle, and a central driver-side airbag (DAB) shaft extends along the steering shaft. The DAB shaft is mounted in the vehicle such that the shaft is stationary. A DAB module containing an airbag is connected to a proximal end of the DAB shaft within an area of the steering wheel. The steering wheel and DAB module are not interactive components, however, which allows the DAB to remain in a fixed position even while the steering wheel rotates about the DAB module. Using a fixed center hub, in which the DAB is installed, on the steering wheel allows for various safety and design advantages, as explained in detail below.

Figure 3:
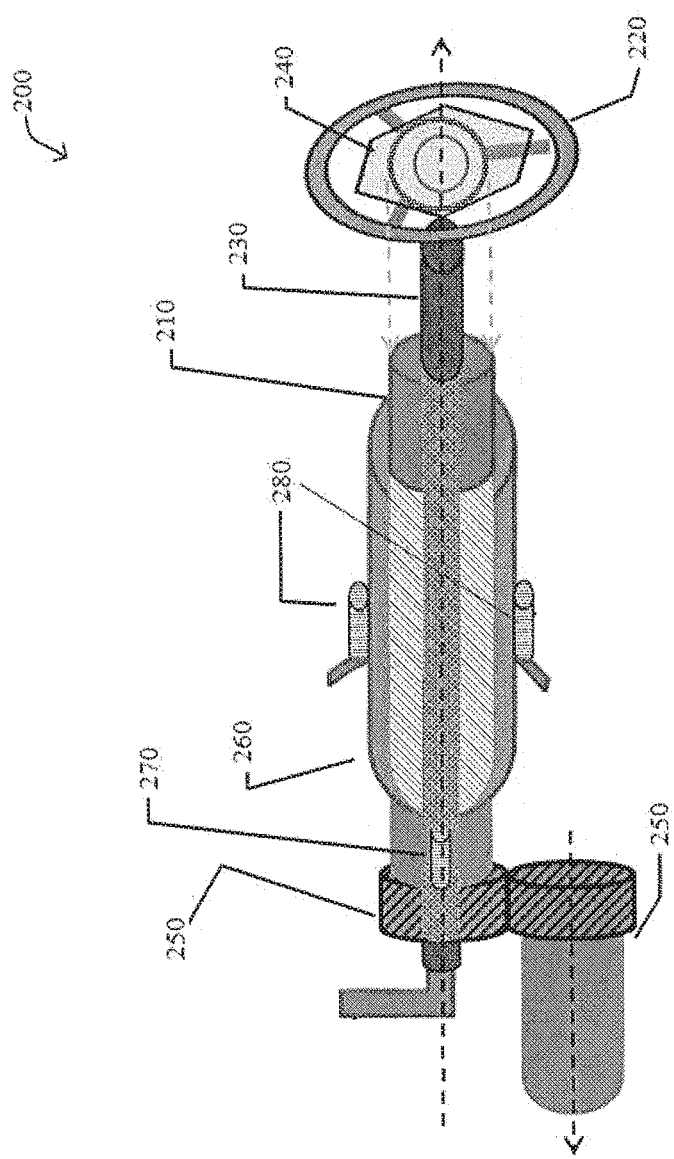
FIG. 3 illustrates an example side view of a steering column system for enhanced vehicle occupant safety according to embodiments of the present disclosure.

FIG. 3 illustrates an example side view of a steering column system for enhanced vehicle occupant safety according to embodiments of the present disclosure. As shown in FIG. 3, a steering column system 200 may include a rotatable steering shaft 210 having a proximal end attached to a steering wheel 220. The proximal end of the steering shaft 210 may be directly attached to the steering wheel 220. The steering shaft 210 may be configured to transfer rotational input at the steering wheel 220 to a steering rack (not shown) of the vehicle. The steering wheel 220 can be freely rotated by a driver of the vehicle, thus rotating the steering shaft 210 correspondingly, as is generally known in the art.

The steering column system may also include a DAB shaft 230 that is mounted in the vehicle, such that the DAB shaft 230 is stationary (i.e., does not rotate), and extends along the steering shaft 210. The DAB shaft 230 may be securely mounted at a distal end thereof to the vehicle, e.g., a body of the vehicle or an instrument panel of the vehicle, to prevent movement or rotation. Furthermore, the steering shaft 210 may be formed to be hollow and may substantially surround the DAB shaft 230. That is, the DAB shaft 230 may be positioned inside of a hollow steering shaft 210. One or more spacing components (not shown), such as needle bearings or the like, may be disposed along an interior of the steering shaft 210 to separate the DAB shaft 230 from the steering shaft 210 and to prevent contact friction between the two shafts.

A DAB module 240 may be fixedly mounted to a proximal end of the DAB shaft 230, such that the module 240 is located within a region of the steering wheel 220. The DAB module 240 may contain an airbag that is deployed upon a collision being sensed at the vehicle, as is generally known in the art. The DAB module 240 may be positioned to oppose a driver of the vehicle during the use of the vehicle, such that the airbag contained in the DAB module 240 effectively cushions the driver from impact in the event of a collision.

Notably, the steering wheel 220 and the DAB module 240 may be de-coupled components which do not interact with one another. That is, the steering wheel 220 may not be attached to the DAB module 240. As a result, the DAB module 240 can remain in a fixed position while the steering wheel 220 rotates about the DAB module 240. Additionally, the steering shaft 210 and DAB shaft may be de-coupled components which do not interact with one another. Therefore, the steering wheel 220 and the steering shaft 210 can rotate independently of the DAB module 240 and the DAB shaft 220, respectively.

The steering column system 200 may further include a gear assembly 250 mounted at a distal end of the steering shaft 210 to transfer rotational input at the steering wheel 220 to the steering rack (not shown), as explained above. The gear assembly 250 may include a set of helical gears. As shown in FIG. 3, a first gear of the set of helical gears may be integrally formed with the steering shaft 210, and a second gear of the set of helical gears may be coupled to the first gear and not integrally formed with the steering shaft 210.

The steering column system 200 may further include an outer shaft assembly 260 that encloses the steering shaft 210 and the DAB shaft 230. The outer shaft assembly 260 may act as a housing for the steering shaft 210 and the DAB shaft 230. The outer shaft assembly 260 may be mounted to the vehicle, e.g., a body of the vehicle or an instrument panel of the vehicle. Further, one or more spacing components (not shown), such as needle bearings or the like, may be disposed along an interior of the outer shaft assembly 260 to separate the outer shaft assembly 260 from the DAB shaft 230 and/or the steering shaft 210 and to prevent contact friction between the outer shaft assembly 260 and the DAB shaft 230 and/or the steering shaft 210.

Additionally, one or more energy absorbing components may be disposed within the steering column system 200 for absorbing energy during a collision event. For instance, one or more internal energy absorbing components 270 may be disposed within an interior of the steering shaft 210. Additionally, or alternatively, one or more external energy absorbing components 280 may be mounted outside of the steering shaft 210, e.g., to a body of the vehicle or an instrument panel of the vehicle. As an example, hydraulic/air energy absorbers or compressible metal foam may be utilized as energy absorbing components. The energy absorbing components can be implemented to provide additional protection for the occupant during loading conditions of a collision event.

Figure 4:
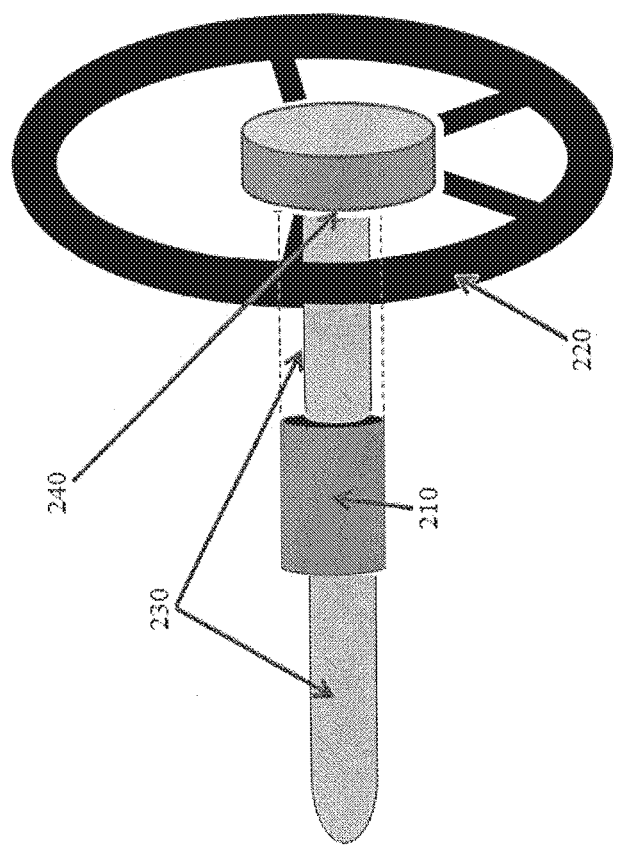
FIG. 4 illustrates an example side view of inner components of the steering column system for enhanced vehicle occupant safety according to embodiments of the present disclosure.

FIG. 4 illustrates an example side view of inner components of the steering column system for enhanced vehicle occupant safety according to embodiments of the present disclosure. As shown in FIG. 4, the inner components of the steering column system 200 include, for example, steering shaft 210, which is connected to the steering wheel 220, and DAB shaft 230, which is connected to the DAB module 240.

As explained above, the DAB shaft 230 may be secured to the vehicle in order to maintain the DAB module 240 in a fixed, non-rotational position. In this regard, a distal end of the DAB shaft 230 may be secured to the vehicle body or the underside of an instrument panel, as an example. A proximal end of the DAB shaft 230 may be attached to the DAB module 240.

Further, the DAB shaft 230 may be substantially hollow and allow for passage of compressed air therethrough for inflation of the airbag contained in the DAB module 240. To this end, the steering column system 200 may further include a compressed gas assembly 290 that is configured to supply compressed gas to the substantially hollow DAB shaft 230, as described in further detail below. As a result, compressed gas may be provided directly to the DAB module 240 through the DAB shaft 230 in order to deploy the airbag in the event of a collision involving the vehicle.

Meanwhile, the steering shaft 210 may connect to the steering wheel 220 and translate rotational input from the driver to the lower gears, i.e., gear assembly 250, and the steering rack. The steering shaft 210 and the DAB shaft 230 may extend in directions parallel to one another. More specifically, the steering shaft 210 may be hollow, allowing for the DAB shaft 230 to extend therethrough such that the steering shaft 210 substantially surrounds the DAB shaft 230. One or more spacing components (not shown), such as needle bearings or other similar components, may be used to separate the steering shaft 210 from the DAB shaft 230 and reduce contact friction therebetween.

Because the steering shaft 210, which connects to the steering wheel 220, and the DAB shaft 230, which connects to the DAB module 240, do not interact with one another, that is, the steering shaft 210 and the DAB shaft 230 are not coupled components, rotation of the steering shaft 210 does not affect the stationary DAB shaft 230. Therefore, the steering wheel 220 and DAB module 240 are also not interactive components, which allows DAB module 240 to remain in a fixed position, even as the steering wheel 220 is rotated while the vehicle is being driven. Advantageously, the design of the steering column system 200 becomes increasingly flexible, as compared to conventional steering column systems, and vehicle occupant safety can be enhanced.

Figure 5:
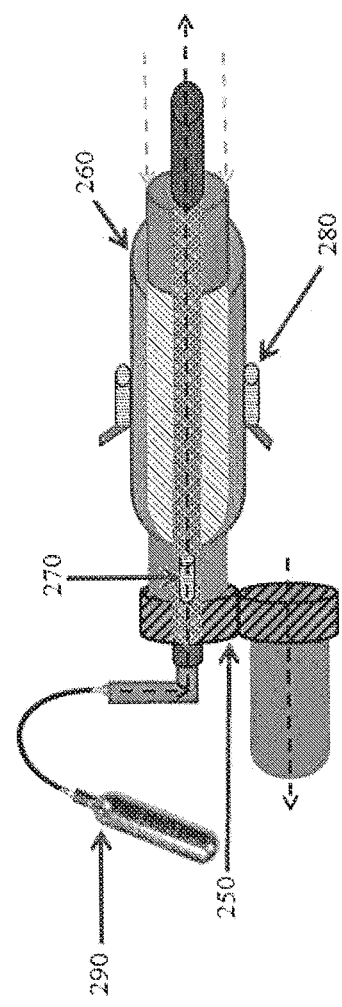
FIG. 5 illustrates an example side view of outer components of the steering column system for enhanced vehicle occupant safety according to embodiments of the present disclosure.

FIG. 5 illustrates an example side view of outer components of the steering column system for enhanced vehicle occupant safety according to embodiments of the present disclosure. As shown in FIG. 5, the outer components of the steering column system 200 include, for example, gear assembly 250, outer shaft assembly 260, energy absorbing components (e.g., internal energy absorbing components 270 and/or external energy absorbing components 280), and compressed gas assembly 290.

As explained above, a gear assembly 250 which may include a set of helical drive gears can be operable to transfer rotational input at the steering wheel 220 from the driver of the vehicle to the steering rack (not shown). A first gear of the set of helical gears may be mounted to or a part of the rotational steering shaft 210. A second gear of the set of helical gears may be coupled to the first gear and mounted separately from the steering shaft 210.

The outer shaft assembly 260 can house the fixed DAB shaft 230 and the rotatable steering shaft 210. One or more spacing components (not shown), such as needle bearings or the like, may be disposed along an interior of the outer shaft assembly 260 to separate the outer shaft assembly 260 from the DAB shaft 230 and/or the steering shaft 210 and to prevent contact friction between the outer shaft assembly 260 and the DAB shaft 230 and/or the steering shaft 210. The outer shaft assembly 260 may be attached to the vehicle, e.g., a body of the vehicle or a lower instrument panel, and be responsible for the required steering column loads and the tilt or telescoping requirements of the steering shaft 210 and steering wheel 220.

Internal and/or external energy absorbing components (e.g., internal energy absorbing components 270, external energy absorbing components 280) can be used to further protect a vehicle occupant during loading conditions of a collision event. For instance, one or more internal energy absorbing components 270 may be disposed within an interior of the steering shaft 210 and the outer shaft assembly 260 (if applicable). One or more external energy absorbing components 280 may be additionally or alternatively mounted outside of the steering shaft 210 and outer shaft assembly 260 (if applicable), e.g., to a body of the vehicle or an instrument panel of the vehicle.

Furthermore, a compressed gas system, such as the compressed gas assembly 290 as shown in FIG. 5, can be used for DAB module 240 inflation. The compressed gas assembly 290 may be mounted remotely of the DAB shaft 230, as shown in FIG. 5, and coupled to the DAB shaft 230 via a tube or other similar coupling means. In this case, the DAB shaft 230 may be substantially hollow to allow for passage of compressed gas provided from the compressed gas assembly to the DAB module 240. Therefore, compressed gas may be provided directly to the DAB module 240 through the DAB shaft 230 in order to deploy the airbag in the event of a collision.

Accordingly, the steering column system according described herein allows for increased flexibility, simplicity of design, and enhanced protection, as compared to conventional steering column systems. For instance, mounting the DAB module 240 as a fixed center hub on the steering wheel 220 enables new driver airbag configurations that enhance occupant protection in certain frontal crash modes. Further, the fixed hub design can enable designing of controls and displays around the DAB module 240. Even further, the fixed hub design allows for the use of compressed gas for driver airbag inflation, thereby reducing the risk of burns associated with solid propellants and permitting gas pressure tuning for different occupant conditions.

The steering column system described herein also allows for direct physical connection of the steering wheel 220 to the steering assembly, e.g., steering shaft 210, steering rack, and the like, without the use of complicated gears, chains, or other torque-transfer mechanisms. In addition, use of energy absorbing components described herein (e.g., internal energy absorbing components 270 and/or external energy absorbing components 280) can replace metal deformation techniques for driver loading of the steering assembly, which may also be tuned to match the loading needs based on occupant mass.

While there have been shown and described illustrative embodiments that provide for a steering column system for enhanced vehicle occupant protection, it is to be understood that various other adaptations and modifications may be made within the spirit and scope of the embodiments disclosed herein. Thus, the disclosed embodiments may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A steering column system of a vehicle comprising:
   a rotatable steering shaft that has a proximal end attached to a steering wheel;
   a stationary driver-side airbag (DAB) shaft that is mounted in the vehicle and extends along the steering shaft;
   a DAB module that is fixedly mounted to a proximal end of the DAB shaft within a region of the steering wheel;
   an outer shaft assembly that encloses the steering shaft and the DAB shaft;
   one or more internal energy absorbing components that are disposed within an interior of the steering shaft for absorbing energy during a collision event; and
   one or more external energy absorbing components that are mounted outside of the steering shaft to a body of the vehicle for absorbing energy during a collision event,
   wherein the steering wheel and the steering shaft are configured to rotate independently of the DAB module and the DAB shaft, respectively.

2. The system of claim 1, wherein the DAB module remains in a fixed position while the steering wheel rotates about the DAB module.

3. The system of claim 1, wherein the DAB module is positioned to oppose a driver of the vehicle during the use of the vehicle.

4. The system of claim 1, wherein the steering shaft is hollow and substantially surrounds the DAB shaft.

5. The system of claim 1, further comprising:
   a gear assembly mounted at a distal end of the steering shaft.

6. The system of claim 5, wherein the gear assembly includes a set of helical gears.

7. The system of claim 6, wherein a first gear of the set of helical gears is integrally formed with the steering shaft, and a second gear of the set of helical gears is coupled to the first gear and not integrally formed with the steering shaft.

8. The system of claim 1, wherein the outer shaft assembly is attached to the body of the vehicle.

9. The system of claim 1, wherein a distal end of the DAB shaft is mounted to the body of the vehicle.

10. The system of claim 1, wherein the DAB shaft is substantially hollow and allows for passage of compressed air therethrough.

11. The system of claim 10, further comprising:
    a compressed gas assembly that is configured to supply compressed gas to the substantially hollow DAB shaft.

12. The system of claim 1, wherein the proximal end of the steering shaft is directly attached to the steering wheel.

* * * * *